W. E. PHELPS.
Land Marker.
No. 78,997.
Patented June 16, 1868.
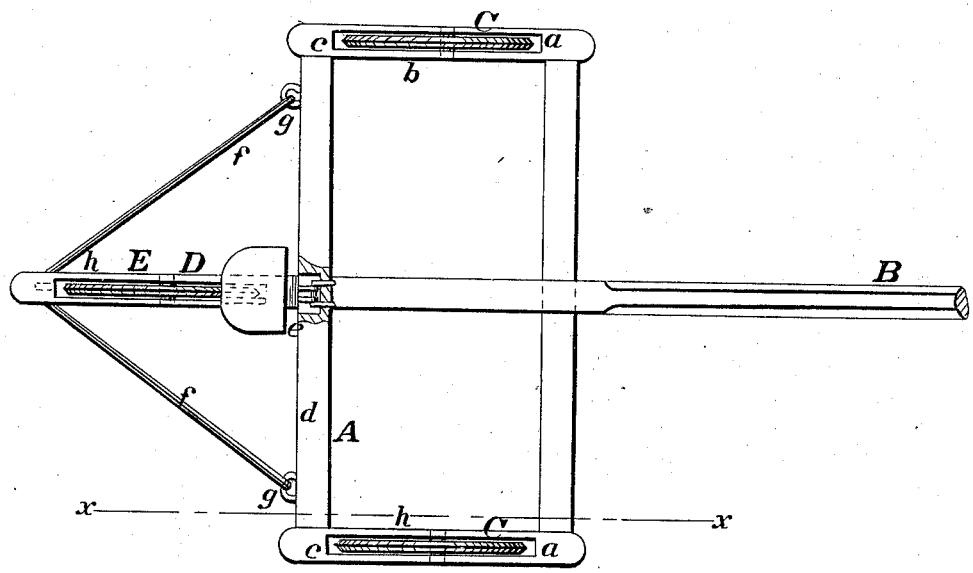
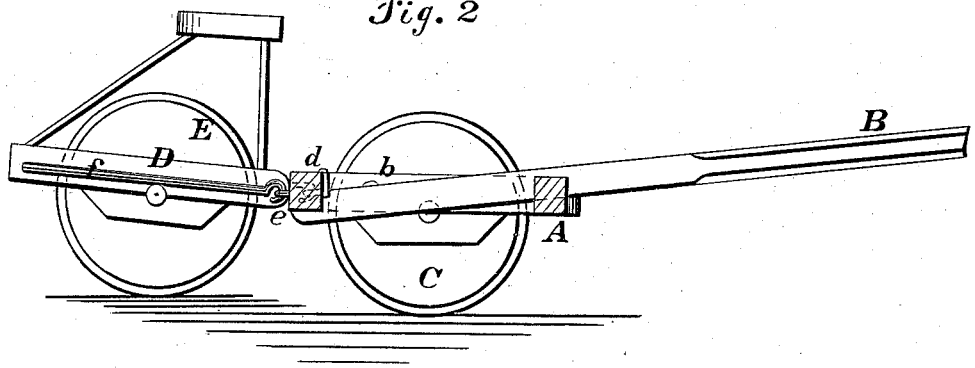

United States Patent Office.

W. E. PHELPS, OF ELMWOOD, ILLINOIS.

Letters Patent No. 78,997, dated June 16, 1868.

IMPROVEMENT IN CORN-MARKER.

*The Schedule referred to in these Letters Patent and making part of the same.*

TO ALL WHOM IT MAY CONCERN:

Be it known that I, W. E. PHELPS, of Elmwood, in the county of Peoria, and State of Illinois, have invented a new and useful Improvement in Corn-Markers; and I do hereby declare that the following is a full, clear, and exact description thereof, which will enable others skilled in the art to make and use the same, reference being had to the accompanying drawings, forming part of this specification, in which—

Figure 1 is a plan or top view of my invention.

Figure 2, a side sectional view of the same, taken in the line $x\ x$ of fig. 1.

Similar letters of reference indicate like parts.

This invention relates to a new and improved device for furrowing or laying off ground in rows to receive seed-corn.

The invention consists in the application of three wheels to a frame, constructed in a usual way, whereby, as the machine is drawn along, three furrows will be made, and the wheels allowed to conform perfectly to the inequalities of surface over which it may pass.

In the accompanying sheet of drawings—

A represents the frame of the machine, which is of rectangular form, and has a draught-pole, B, attached to it.

This frame is supported by the wheels C C, which are fitted and work in oblong slots $a\ a$ in the side-bars $b\ b$ of the frame A, said wheels C being bevelled at each side at their peripheries, to form V-shaped edges, as shown at $c$ in fig. 1.

To the centre of the rear cross-bar $d$ of the frame A, there is attached, by a joint, $e$, a bar, D, said bar projecting at right angles from the cross-bar $d$, and braced by rods $ff$ attached to D near its end, and attached to the cross-bar $d$ by hook and staple-joints $g\ g$.

These rods $ff$ prevent the bar D from playing or moving laterally, but said bar is allowed to rise and fall freely.

In this bar D there is made an oblong slot, $h$, in which a wheel, E, is fitted and allowed to turn freely, said wheel being bevelled at each side at its periphery, like the wheels C C.

The wheels C C E are equidistant from each other, and it will be seen that, as the machine is drawn along, the wheels will make the furrows or marks in the earth, the rear wheel E being allowed to rise and fall, to conform to the inequalities of surface over which it may pass.

The other wheels C C of course always conform to the undulations of the surface of the ground.

These wheels attached to a rigid frame would not answer, from the fact that in passing over uneven ground all the wheels would not, in many cases, be in contact with the ground at the same time, a difficulty which is fully obviated by my improvement.

The driver's seat is placed on the bar D, to give it the necessary weight.

Having thus described my invention, I claim as new, and desire to secure by Letters Patent—

The frame A, provided with the two wheels C C, one at each end, in combination with the bar D, connected to the rear of frame A by a joint, $e$, and provided with a wheel, E, all constructed and arranged substantially in the manner as and for the purpose set forth.

W. E. PHELPS.

Witnesses:
W. P. TRACY,
S. M. FARRAR.